April 3, 1956 J. DAVIDSON, JR 2,740,841

AUTOMATIC RURAL CROSSBAR SWITCHING SYSTEM

Filed Jan. 16, 1953 5 Sheets-Sheet 1

INVENTOR
JOHN DAVIDSON, JR.
BY Robert Harding Jr.
ATTORNEY

April 3, 1956 J. DAVIDSON, JR 2,740,841

AUTOMATIC RURAL CROSSBAR SWITCHING SYSTEM

Filed Jan. 16, 1953 5 Sheets-Sheet 2

INVENTOR
JOHN DAVIDSON, JR.
BY
Robert Harding Jr.
ATTORNEY

AUTOMATIC RURAL CROSSBAR SWITCHING SYSTEM

Filed Jan. 16, 1953 5 Sheets-Sheet 3

INVENTOR
JOHN DAVIDSON, JR.
BY Robert Harding Jr.
ATTORNEY

INVENTOR
JOHN DAVIDSON, JR.
BY Robert Harding Jr.
ATTORNEY

April 3, 1956 J. DAVIDSON, JR 2,740,841

AUTOMATIC RURAL CROSSBAR SWITCHING SYSTEM

Filed Jan. 16, 1953 5 Sheets-Sheet 5

INVENTOR
JOHN DAVIDSON, JR
BY Robert Harding Jr.
ATTORNEY 2,740,841

AUTOMATIC RURAL CROSSBAR SWITCHING SYSTEM

John Davidson, Jr., Upper Montclair, N. J., assignor to International Telephone and Telegraph Corporation, a corporation of Maryland Application January 16, 1953, Serial No. 331,699

10 Claims. (Cl. 179—22)

This invention relates to telephone systems and more particularly to rural telephone switching systems for providing service in sparsely settled sections of the country.

The provision of telephone service in sparsely settled rural sections has often necessitated the use of magneto telephones and has required the services of individuals in a farmer's home or store to set up or take down the connections. Although such arrangements have had considerable use, they involve serious delays as individuals to set up the connections may not be readily available. Moreover, such an arrangement is not conducive to good telephone service since difficulties are experienced in obtaining the proper type of people to perform the operating duties for a commensurate salary and because the traffic which is originated by these rural communities is extremely light, it is necessary that the equipment and operating expenses be kept to a minimum.

One object of the present invention is the provision of an inexpensive rural crossbar telephone switching system which will permit magneto subscribers to establish local calls without the aid of an operator and without changes in their existing magneto station equipment.

Toll calls which require detailed information as to the time of conversation are established through a master office with the aid of an operator.

According to one feature of my invention commutator means is provided at a central office or position, which, responsive to an operation at a calling station, cyclically prepares the central office switching equipment successively to make connection to the station lines in turn, and successively and in synchronism transmits to the calling station line distinctive signals characteristic of the identity of the station lines to which connections are cyclically prepared. Responsive to a further timed operation at the calling station the switching equipment at the central office is actuated to complete a prepared connection to a wanted station line.

According to a further feature of my invention the switching equipment at the central office comprises a crossbar switch, the station lines and trunks being connected both to horizontal and vertical terminals thereof. Means is provided at the central office, which, responsive to a calling signal sent from a calling station, causes the energization of a horizontal magnet particular thereto and cyclically prepares circuits for the vertical or holding magnets and causes the transmission over the calling line of audible signals characteristic of the identity of the connections as they are prepared. Upon the transmission of a further signal from the calling station, a circuit is completed for the appropriate vertical magnet to establish the connection to a wanted station line or trunk.

These and other features of the invention will be described more fully in the following detailed specification.

In the drawings which accompany the specification,

Figure 6:
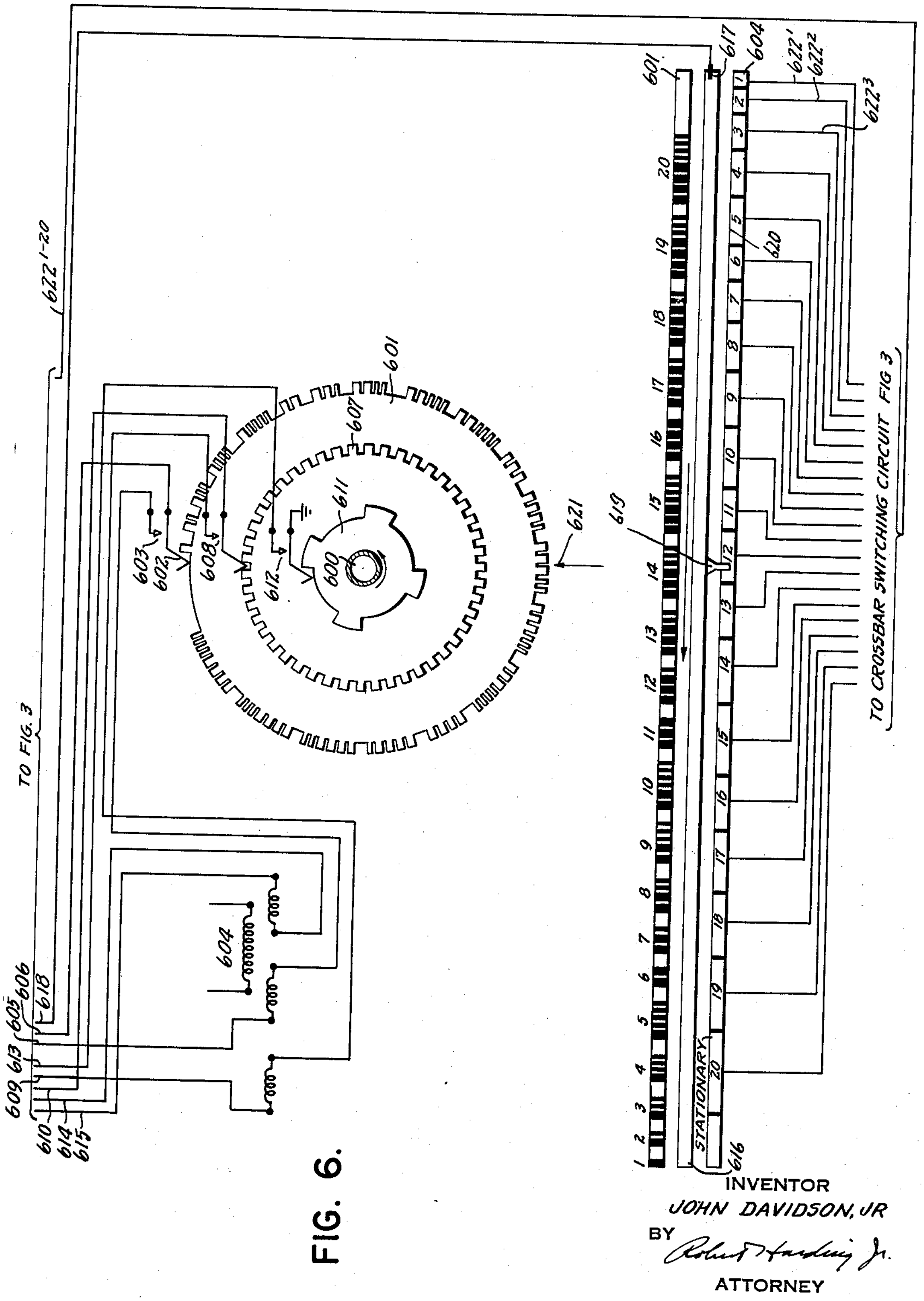

Fig. 6 diagrammatically illustrates tone interrupter and control cam equipment provided at the rural offices.

Figures 1, 5:
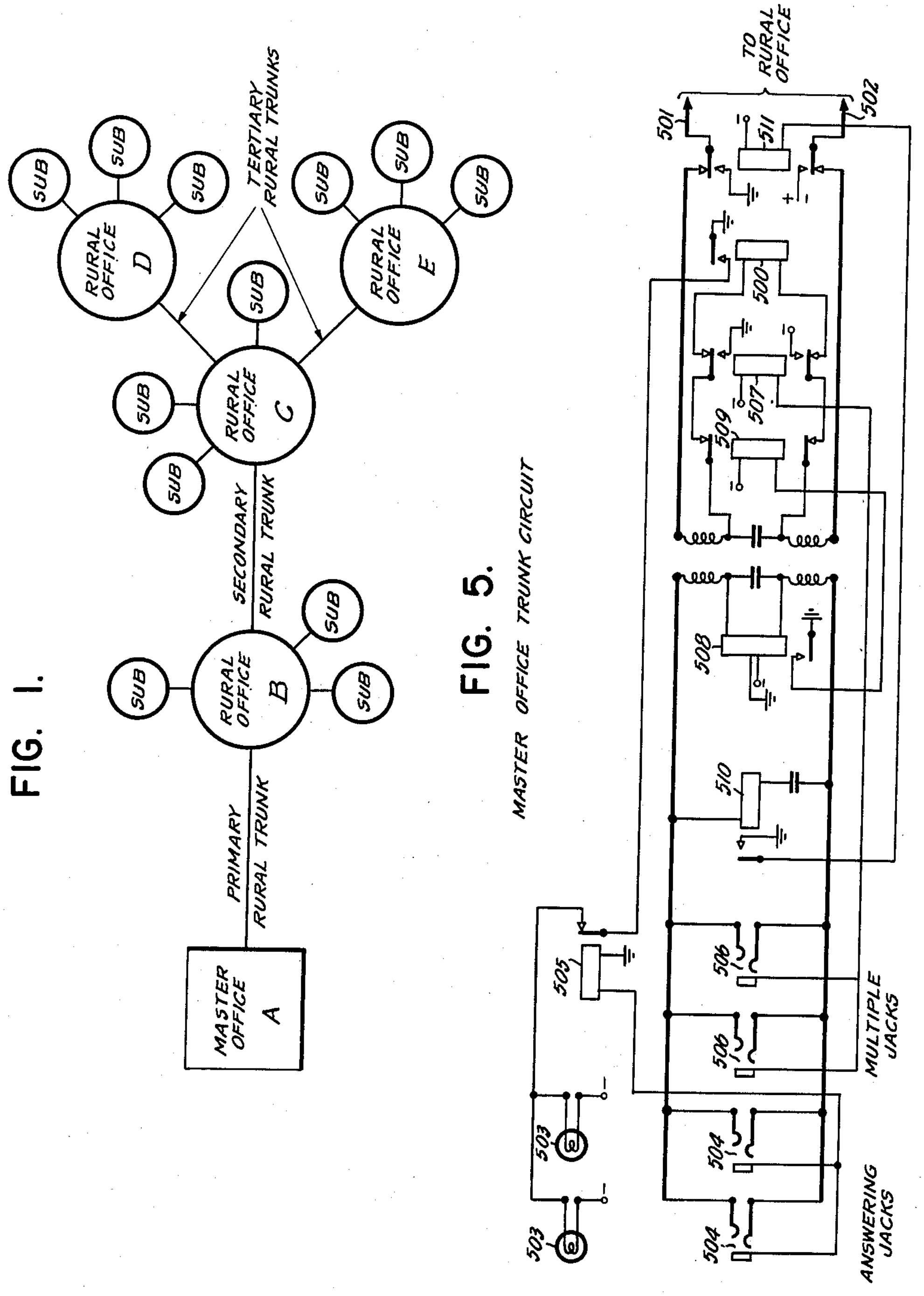
Fig. 1 illustrates the layout of a rural area comprising four rural offices B, C, D and E, and a master office A.
Fig. 5 shows a master office trunk circuit.

The proposed automatic system, which is preferably limited to small rural installations of approximately 10 to 20 lines, provides practically the same operating features as are obtained with dial telephones but does not necessitate the use of dials at the subscribers' stations. As is illustrated in Fig. 1, the switching equipment is suitable for establishing connections between subscribers within any rural area B, C, D or E, between subscribers in two adjacent rural areas, such as, for example, C and D, between subscribers in two rural areas, separated by one or more other rural areas, such as, for example, connections between subscribers in office B and office D, and between a rural subscriber and the master office A, where an operator handles more distant connections to and from the rural area which involves additional charges. Each rural subscriber is provided with a card or miniature directory indicating the names of the subscribers which can be reached and the tone code signals or other identifying signals which are used to reach these subscribers and the master office.

Should a subscriber in any rural area B, C, D or E wish to talk with another subscriber in the same area, he will remove his receiver from the switch hook, ring the switching equipment and listen to the tone code signals representing the subscribers who can be reached without going through another rural office. When the calling subscriber hears the code signal of the desired party, he will vibrate the switch hook or depress it for an instant if the rural lines are arranged for common battery operation. The crossbar switching equipment then functions to establish the connection. The calling subscriber will know that the connection has been established by the disappearance of the tone code signals and he will then ring the called party. If the called party is on a multiparty line, the calling subscriber will ring the wanted party using the proper ringing code. If the called party's line is busy, the calling subscriber receives a busy signal.

If the call is from one rural area to a subscriber in an adjacent rural area, the calling subscriber will first listen for the code representing the desired rural area, depress the switchhook for an instant to connect to a trunk leading to the desired rural area, and then listen for the code allocated to the wanted party. If the trunk to the adjacent rural area or the desired party's line is busy, the calling subscriber will receive a busy signal. With this exception, the procedure is the same as for calls within the same rural area. If the call is from one rural area to a subscriber in a rural area reached through an adjacent rural area, the calling subscriber first listens for the code representing the adjacent rural area, depresses the switchhook for an instant, then listens for the code representing the more remote rural area, depresses the switchhook again for an instant, listens for the code of the desired party, and depresses the switchhook yet again for an instant to establish the connection. If either the interoffice trunk or the wanted subscriber's line is busy, the calling subscriber will receive a busy signal; otherwise the procedure on the part of the calling subscriber is the same as has been described.

On calls to the master office A, the procedure is the same, as has been described, with the exception that the master office operator is called in on the connection with a line lamp signal and it is not necessary for the calling rural subscriber to ring the operator.

Timing equipment is provided at each rural exchange to hold connections established at that exchange for a definite period of time. After the expiration of this time interval, the connection is automatically released at that rural exchange. If two or more rural exchanges are involved in a connection, two or more timing equipments may be involved, and these timers may not time exactly the same. However, a warning signal is given to the calling subscriber before any of the timers release the connection, and the calling subscriber may continue his conversation by depressing the switchhook for an instant which resets all the timers involved, so that they start anew to measure the timing periods. Suitable arrangements are provided whereby in each rural office calls are established one at a time, and a multiplicity of calls are established approximately in the same order as they are originated.

The tone interrupter and control cam equipment, provided in the rural exchanges and diagrammatically illustrated in Fig. 6, will first be described, since it is believed that this will facilitate the reading of the following description of the operation of the system in setting up calls.

Mounted upon the rotating shaft 600 is a cam disk 601 the periphery of which is cut with narrow (dot) and wide (dash) teeth representative of the codes allotted to the subscribers lines and to the outgoing trunks. As illustrated, provision is made for twenty codes which may be apportioned between substation lines and trunks, as desired. At the lower part of the figure there is indicated a linear representation of the periphery of the cam disk 601. A spring brush 602 bears on the periphery of the disk 601 and as the disk 601 and shaft 600 rotate, acts to close the contacts 603 to apply tone intermittently from the supply 604 to the leads 605, 606, interrupted in accordance with the codes. These leads deliver the coded tones to the cross-bar switch circuit of Fig. 3. A second toothed disk 607 mounted on the shaft 600 actuates contacts 608 to apply interrupted busy tone to the leads 609, 610 as the shaft rotates which leads are multiplied to all the line circuits and interoffice trunk circuits, and a third cam disk 611 is arranged to actuate contacts 612 to ground periodically the timing lead 613 for a purpose which will be explained later. A continuous tone signal is supplied over the leads 614, 615, independently of the rotation of the shaft 600 and disks 601, 607, and 611. The leads 614 and 615 are multiplied to all the line circuits.

Figure 3:
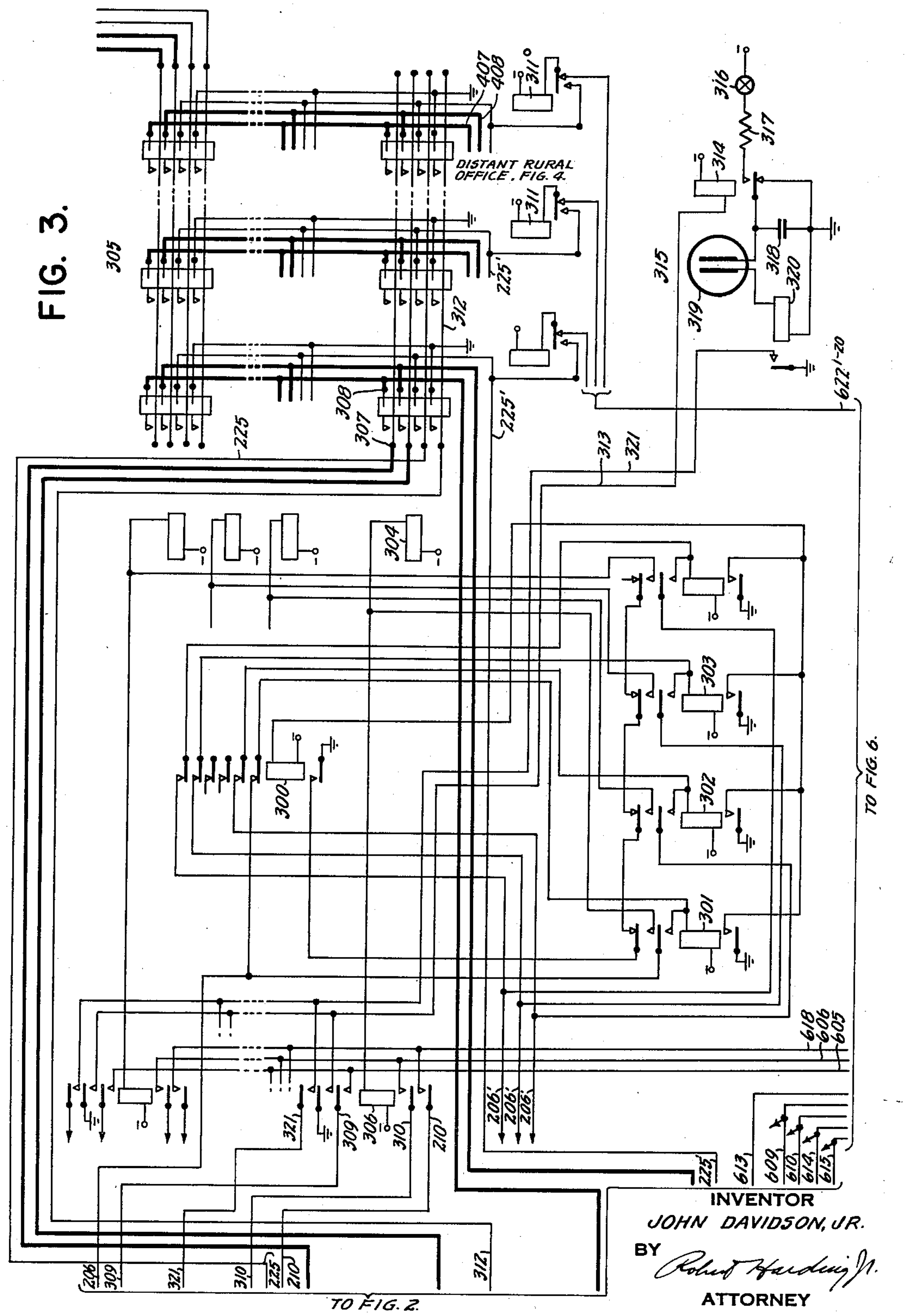
Fig. 3 shows a crossbar switching circuit, such as is provided at the rural offices.

Mounted on the shaft 600, which rotates in a counterclockwise direction, is a slip ring 616 (shown in extended form) engaged by a brush 617 connected to a lead 618 which is connected with the cross-bar switch circuit. A brush 619 is fixed to the slip ring 616 and makes contact with a stationary commutator 620 (also shown in extended form). The vertical line 621 indicates the point on the extended commutator 620 which is aligned with the make contacts 603. A commutator segment is provided on the commutator 620 for each code combination on the cam disk 601, and each segment is connected to a different lead $622^1$, $622^2$, $622^3$, etc. extending to one end of the winding of a respective hold magnet of the crossbar switch (Fig. 3). The commutator segments are so positioned and are of such relative widths that a circuit is held prepared over the lead 618, brush 617, slip ring 616, brush 619, a segment of commutator 620, and a lead 622, for the appropriate hold magnet of the crossbar switch, in the interval during the transmission of each code signal over the leads 605, 606.

*Rural subscriber calls another subscriber on same rural office*

Figure 2:
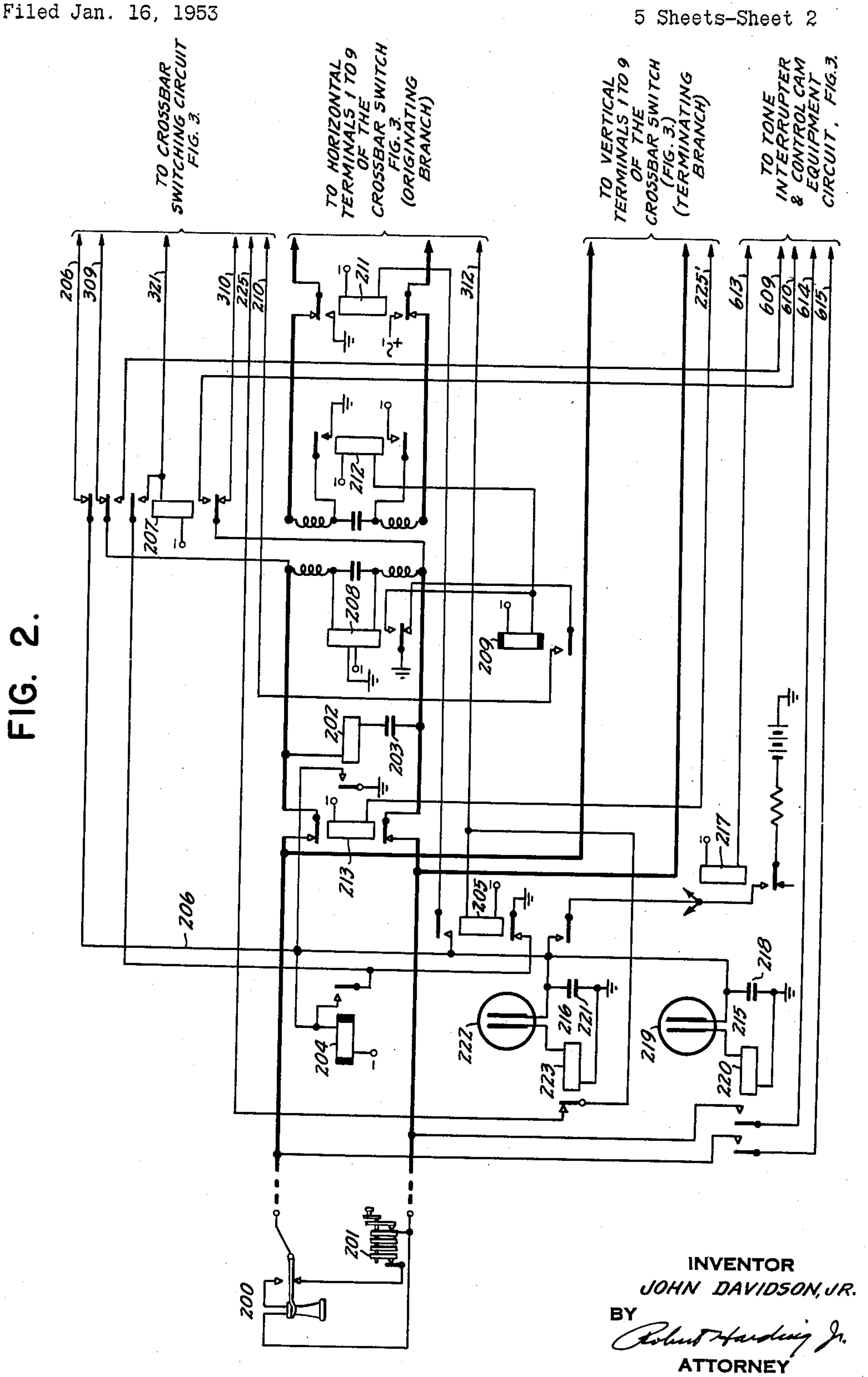
Fig. 2 shows a rural subscriber's line circuit.

A calling subscriber at substation 200 connected to the rural line circuit of Fig. 2, cranks his magneto 201, thereby energizing a line relay 202 bridged across the talking conductors in series with a condenser 203 in the rural line circuit. The subscriber immediately raises his receiver and listens. Upon raising his receiver, the subscriber's line is closed and this completes an obvious circuit through relay 208 which operates. Relay 208 operates 209 which is slow releasing. Neither of these relays 208 and 209 perform any function at this time. The operation of relay 202 closes an obvious circuit for relay 204 which is made slightly slow releasing and which locks to ground at back contacts of relay 205 and extends this ground to the lead 206 extending to the crossbar switching circuit, Fig. 3.

In the crossbar switching circuit, each of the leads, such as 206, from the respective subscribers' line circuits, extends over back contacts of a common relay 300 to an individual relay 301, 302, 303, etc., and when a call has originated on a rural line, the ground connected over the lead 206 operates a relay, such as 301, associated with the particular calling rural line. If several calls are originated simultaneously, the relays 301, 302, 303, etc., of those lines will operate and lock up to the ground on their respective leads 206.

As previously stated, the operating paths for the relays 301, 302, 303, etc., extend over back contacts of the common relay 300 which energizes over an obvious circuit as soon as any relay 301, 302, 303, etc. operates. This prevents any other of the relays 301, 302, 303, etc., from operating until calls already admitted within the "gate" have been handled and all the energized relays 301, 302, 303, etc., have been released. At that time another group of waiting calls will be admitted within the gate for attention. This arrangement is provided to enable the calls to be handled approximately in the same order as they were originated. It will be noted that the uppermost contacts of the relays 301, 302, 303, etc., are connected in a chain circuit to permit the calls awaiting attention to be handled one at a time and in a regular order from left to right of the relays 301, 302, 303, etc. The ground for assigning the line and for the further operation of the switching circuit is provided from the bottom make contact of relay 300. At contacts of the first operated relay 301, 302, 303, etc. this ground from relay 300 is connected to and energizes the particular one of the horizontal or select magnets 304 of the crossbar switch 305 and also one of the relays 306 particular to the calling line receiving attention.

The rural substation lines and the interoffice trunks are connected to both the horizontal and vertical terminals 307, 308, of the crossbar switch 305, the horizontal terminals 307 being used on calls originated on the rural lines or trunks, and the vertical terminals 308 being used on calls completed to the rural lines or trunks. These connections are shown in heavy lines.

The operation of the individual relay 306 causes the tone code signals which are received from the tone interrupter of Fig. 6 over leads 605, 606 to be connected over leads 309 and 310 and back contacts of the relay 207, Fig. 2, to the calling subscriber's line.

When the calling subscriber recognizes the code signal particular to the wanted local rural subscriber, he signals by vibrating his switchhook. The down movement of the switchhook opens the direct current path through the subscriber's loop, and relay 208 releases. Since relay 209 is slow to release, ground is momentarily connected over break contact of relay 208 and make contact of relay 209 to the lead 210, and a circuit is completed over lower make-contacts of the particular relay 306, Fig. 3, and lead 618 to the tone interrupter and control equipment of Fig. 6. If the calling subscriber has vibrated or depressed his switchhook on the proper tone code signal, this ground will be switched through the brush 617, slip ring 616, brush 619 and the commutator 620 to the proper lead, for example, lead $622^2$ extending to the proper vertical or hold magnet 311 of the crossbar switch 305 which operates and establishes the desired connection through the crossbar switch 305. When this is done, ground is applied over the lead 312 to energize the relay 205, Fig. 2, which opens the locking circuit of relay 204, thereby removing ground from the lead 206. This removal of ground from the lead 206 allows the associated relay 301, Fig. 3, to release, and the crossbar switching circuit to advance to the next waiting call. It will be noted that the release of relay 301 also releases the associated relay 306 and the crossbar switch select magnet 304. It will also be noted that the ground on the lead 312 is extended over back contacts of relay 223, lead 225, and horizontal and vertical terminals of the operated crossbar switch 305 to the sleeve lead 225′ of the called line. The hold magnets 311 are provided with make-before-break contacts over which they lock up to the grounded sleeve leads.

The calling subscriber will know that the connection has been established by the disappearance of the tone code signals which are disconnected at front contacts of relay 306, and he will then ring the called party by cranking his magneto 201. Since the relay 205 is now energized, the further operation of relay 202 will close a circuit for relay 211 which at its make contact applies ringing current to the called line. If the called party is on a multi-party line, the calling subscriber will ring the necessary code. Relay 208, which remains energized when the switch-hook at the sub-station is in its raised position, also closes a circuit for relay 212 which at its make contacts connects talking battery to the called subscriber's line. It will be observed that the relay, such as 213, in the called subscriber's line circuit will have been operated over the grounded sleeve lead, such as 225′ which leads to that line, and that the normal battery supply of the called line will have been disconnected.

The operation of any individual relay 306, Fig. 3, which connects up the tone code signals, also connects a ground to the lead 313 to energize a common relay 314 to start a timing circuit 315. Relay 314 connects battery over an interrupter 316 and resistance 317, to charge a condenser 318 to a sufficient voltage to fire a cold cathode tube 319 and operate a relay 320. The desired time interval is obtained by adjusting the values of the resistance 317 and condenser 318. Should the called line be busy and the switching circuit is unable to complete the desired connection within the established period of time or should the calling subscriber fail to give the signal within the established time interval, the relay 320 will operate and apply a ground to the lead 321 which is connected to make contacts of all the relays 306 thereby operating relay 207 in the line circuit, Fig. 2 over contacts of the operated relay 306. The operation of relay 207 causes a busy tone signal received over the leads 609, 610 of the tone interrupter, Fig. 6, to be transmitted to the calling line. The operation of relay 207 also opens the ground on the lead 206 thereby de-energizing the relay 301 of the switching circuit, Fig. 3, and causing such swtiching circuit to advance to the next waiting call.

Assuming that the called line is free, two timing circuits 215, 216 in the line circuit, Fig. 2, come into operation upon energization of relay 205. These timing circuits are similar to the timing circuit 315 of Fig. 3, but a further lengthening of the time interval is obtained by the introduction of a common relay 217, which is operated from ground through contact 612, closed by an interrupter cam 611, Fig. 6, over the lead 613. A make contact of this relay connects battery to an armature of all the relays 205 associated with the line circuits. The first timing circuit 215, comprising condenser 218, cold cathode tube 219 and relay 220, is arranged after, say, four minutes, to connect a steady tone from the leads 614, 615, Fig. 6, to the calling subscriber's line, indicating that the allotted conversation time has almost expired and that the calling subscriber must give a ringing signal if he desires to continue his conversation.

The second timing circuit 216, comprising condenser 221, cold cathode tube 222 and relay 223, is set for a slightly longer interval, say, four and one-half minutes, and is arranged to force the release of the connection by disconnecting a ground if the subscriber does not indicate a desire to continue. The relay 223 at its back contacts removes the ground on lead 312 from the sleeve leads 225, 225′, thereby unlocking the hold magnet 311. This results in the release of the relay 205 and the return of the rural line circuit to its normal condition. A ringing signal from the calling subscriber indicating that he desires to continue would again energize relay 202, which will discharge the condensers 218 and 221 and de-ionize the cold cathode tubes 219 and 222 causing both timing circuits to start anew before the relay 223 operates.

*Call from a subscriber of one rural office to a subscriber in a distant rural office*

Figure 4:
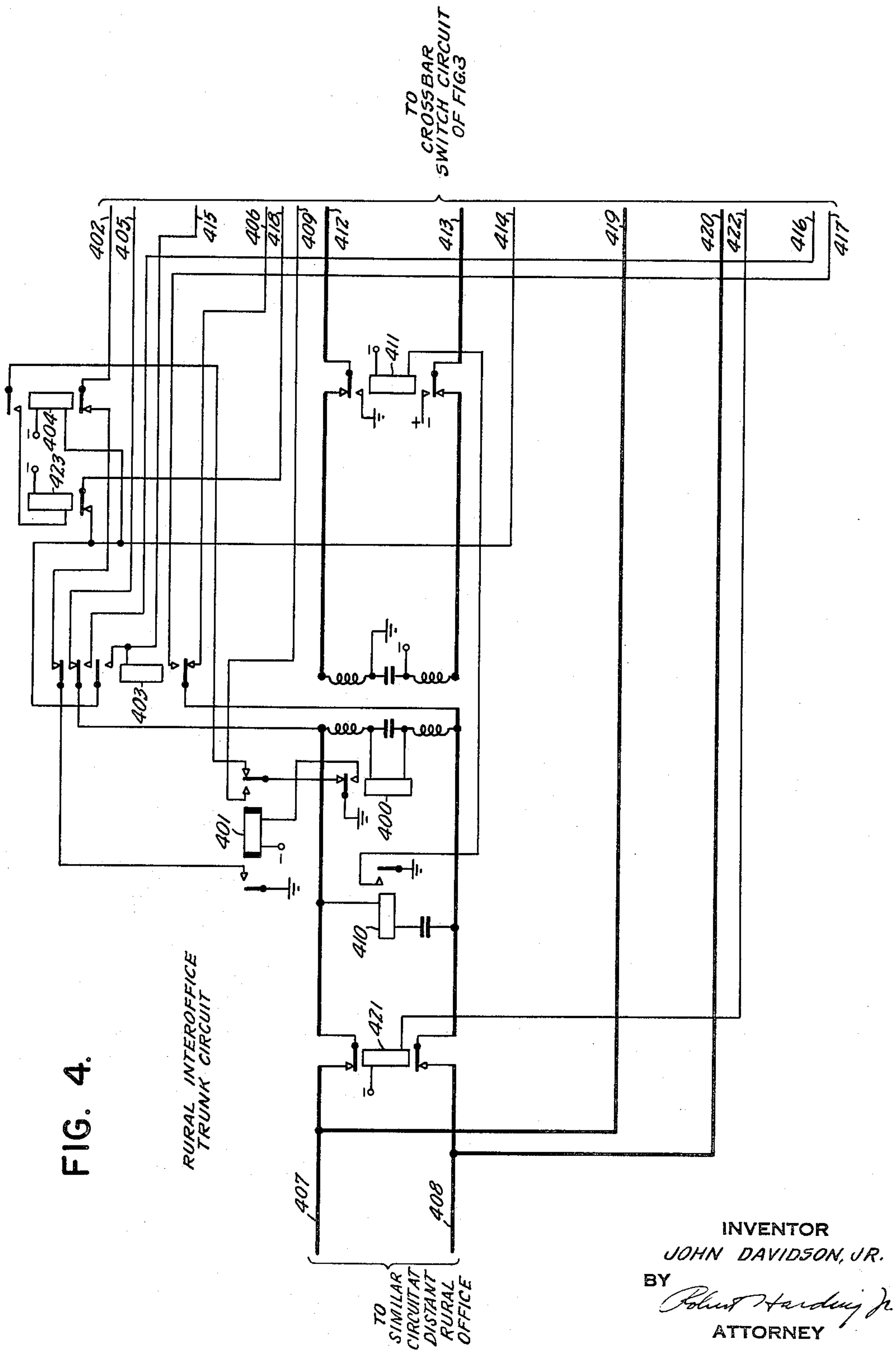
Fig. 4 shows a rural interoffice trunk circuit.

Calls from a subscriber of one rural office to a subscriber of a distant rural office make use at each rural office of a rural interoffice trunk circuit which is shown in Fig. 4. The leads at the right hand side of this circuit in a rural office correspond to the leads at the right hand side of the line circuit of Fig. 2 and connect to a set of leads in the crossbar circuit of Fig. 3 corresponding to those on the left of Fig. 3 but which are individual to the trunk circuit, except that leads 613, 614 and 615 of Fig. 3 have no counterpart in Fig. 4, since they are not needed.

The outgoing end (conductors 419, 420, 422) of the rural inter-office trunk circuit, shown in Fig. 4, is connected to a particular set of the vertical terminals of the crossbar switch, whilst the incoming end (conductors 412, 413, 414, 418) is connected to a particular set of the horizontal terminals. The talking conductors 407 and 408 lead to the distant office and are connected to similar conductors of the interoffice trunk circuit at that office.

If the call is from one rural office, for instance, that shown in Figs. 2 and 3, to a subscriber in a distant rural office, the calling subscriber cranks his magneto, as in the case of a local call, and will listen for the code representing the outgoing trunk leading to the desired distant rural exchange. He will then momentarily depress his switch-hook, as in the case of a local call, and in the crossbar switch of his rural office a hold magnet, such as 311⁰ of the crossbar switch 305 of Fig. 3, will be operated and establish a connection over the talking conductors 419 and 420 of the trunk circuit (Fig. 4) at that office and the talking conductors 407 and 408 to the rural interoffice trunk circuit, Fig. 4, located at the distant rural office. Relay 421 of the trunk circuit at the calling exchange is energized over the sleeve wire 422 and talking battery is fed over the trunk leads 407 and 408 from the calling line circuit. Relay 400 in the trunk circuit at the distant office operates from battery and ground at front contacts of relay 212 in the calling line circuit, and slow release relay 401 is energized over an obvious circuit, thereby maintaining ground on lead 402 over back contacts of relays 403 and 404. The ground on lead 402 causes the crossbar switching circuit in the distant rural office to function, as already described in connection with Fig. 3, when ground was connected to lead 206 from the subscriber's line circuit of Fig. 2. The crossbar switching circuit at the distant rural exchange will return a second set of tone code signals to the calling subscriber over conductors 405, 406, corresponding to 309, 310, back contacts of relay 403 and the talking conductors 407, 408 of the interoffice trunk circuit to the trunk circuit of the calling office, and over talking conductors 419 and 420 and the crossbar switch of Fig. 3 to the calling line. When the calling subscriber hears the proper tone code signal, designating the wanted subscriber in the distant rural office, he again momentarily depresses his switch-hook, intermittently de-energizing relay 212 in his line circuit, Fig. 2. Relay 400 in the distant trunk circuit is thereby de-energized and closes a circuit over the front contact of the slow release relay 401 and the lead 409 and the lead corresponding to lead 210 of Fig. 3 to operate the crossbar switch at the distant rural office and establish the desired connection. The locking circuit for the hold magnet of the crossbar switch at the distant local office extends over lead 414 (corresponding to lead 312 of Fig. 3), back contacts of relay 423 and lead 418 (which corresponds to lead 225 of Fig. 3). Ground on the lead 414 also operates relay 404. As in the case of a local call, the calling subscriber will recognize the establishment of the connection by the disappearance of the tone code signals and will then ring the called subscriber, which will result in the operation of relays 202 and 211 in the calling line circuit. The ringing current will pass over the talking leads, through the crossbar switch at the calling exchange, through the transformer of the trunk circuit of the calling exchange, and will enter the trunk circuit of the distant exchange over the talking leads 407 and 408. Relay 410 will operate and will operate relay 411. Relay 411 will apply ringing current to the called line over the trunk conductors 412, 413, which are now connected to the called line over the crossbar switch in the distant rural office. The operation of relay 404 removes the ground on the lead 402 and the switching circuit at the distant rural office is allowed to advance to the next wating call. Should the called line be busy and the switching circuit be unable to complete the desired connection within the established period of time, or should the calling subscriber fail to give the switch-hook signal within the predetermined time interval, as has been described in connection with a local call, a ground will be received over the lead 415 from the timing device of the distant rural office, corresponding to the device 315 of Fig. 3, to energize the relay 403, which locks to the grounded lead 414. The operation of relay 403 causes a busy tone signal on the leads 416, 417 from the tone interrupter equipment of the distant rural office (corresponding to leads 610, 609, Fig. 6), to be transmitted over the talking conductors 407, 408 to the calling subscriber. The operation of relay 403 also opens the ground on the lead 402 (extending to a lead of the switching circuit of the distant rural office, corresponding to lead 206 of Fig. 3) and allows the switching circuit at the adjacent rural office to advance to the next waiting call.

When the calling subscriber's line circuit "times" out and the rural interoffice trunk is released at the rural exchange to which the calling subscriber belongs, relays 400 and 401 will be de-energized. By the release of these relays, a circuit is closed for slow operating release relay 423 which disconnects ground from the lead 418 causing the switching circuit at the distant rural office to be released. Ground is thereby removed from lead 414, relay 404 is de-energized, and the trunk circuit restored to its normal condition.

If the call is from one rural office to a subscriber in another rural office reached through an adjacent rural office, the calling subscriber first listens for the code representing the adjacent rural office, momentarily depresses his switchhook, listens for the code representing the more remote local office, again momentarily depresses his switchhook, listens for the code of the desired party in the more remote rural office and again momentarily depresses his switchhook to complete the connection. If either of the interoffice trunks or the wanted subscriber's line are busy, the calling subscriber will receive a busy signal. All these operations take place as already described and will be readily understandable to those versed in the art.

As a means for subscribers to detect the advancement of the connection from one office to another, a different tone pitch may be used for the tone code signals in adjacent exchanges.

*Master office trunk circuit*

The master office trunk circuit, illustrated in Fig. 5, is arranged for incoming and outgoing traffic and the procedure in setting up a connection on an incoming call is the same as has been described in connection with a call to an adjacent rural office, since the trunk terminates at the distant rural office in a trunk circuit, as shown in Fig. 4. When the trunk circuit is seized at a distant rural office, the relay 500 is energized over the talking conductors 501, 502. The energization of relay 500 lights the answering lamps 503, and when the operator plugs into an answering jack 504, relay 505 energizes over the sleeve and extinguishes the lamp signal. The operator ascertains the calling parties requirements and completes the connection in any well-known manner.

On an outgoing call to the rural office, the operator will plug into a multiple jack 506 of the trunk circuit, thereby energizing relay 507 over the sleeve. Relay 508 does not operate at this time, because the operator's circuit is arranged to be open for direct current. The operation of relay 507 disconnects relay 500 from the talking conductors and connects battery and ground thereto to energize a relay, such as 400, Fig. 4, in the rural office, to start the switching circuit at the rural office to function and return the tone code signals, as already described in connection with an interoffice call. When the operator hears the desired signal, she will intermittently operate the relay 508 by completing the direct current connection and in turn the relay 509 to cause the distant switching equipment to establish the connection, as already described. When the operator actuates her ringing key, relays 510, 511, operate, the last-mentioned relay connecting ringing current over the trunk conductors 501, 502 thereby operating ringing relays such as 410, 411, Fig. 4, in the trunk circuit at the distant end of the trunk. No disconnect signal is given to the operator at the end of conversation and it is necessary for her to monitor in on the connection to know when the trunk should be released.

While I have described and illustrated one specific application of my invention, it will be clear to those versed in the art that variations in the manner of carrying out my invention may be made, as well as re-arrangement of the circuits, without departing from the spirit and scope of my invention as defined in the appended claims. For example, instead of tone code signals, a magnetic or other voice recorder may be provided at the central office or position, so that a calling station party hears a roll call of the other subscribers or other offices by name as the connections are prepared by the switching equipment. Moreover, it will be understood that the term "station lines" used in the claims embraces both subscriber station lines and trunk lines to other offices.

What I desire to claim and secure by Letters Patent is:

1. A telephone system comprising a plurality of station lines, central office switching equipment, connections from said station lines to said switching equipment, means at said central office responsive to an operation at a calling station for cyclically preparing said switching equipment successively to make connection to said station lines, means at said central office for successively and in synchronism with said preparing means transmitting discrete distinctive signals to said calling station, each discrete signal being characteristic of the identity of a different station line to which connections are prepared, and means at said central office responsive to a further operation at said calling station for actuating said switching equipment to complete a prepared connection to a wanted station line.

2. A telephone system, according to claim 1, further comprising a timing device at said central office associated with a station line circuit and means controlled by said timing device for forcing release of an established connection after a predetermined time interval.

3. A telephone system comprising a plurality of station lines equipped with magnetos, a central office, switching equipment at said central office, connections from said station lines to said switching equipment, an interrupter and control device at said central office, relay means at said central office responsive to the operation of a magneto at a calling station for causing said interrupter and control device to prepare cyclically said switching equipment to make connection successively to said station lines and to apply synchronously with the cyclical preparation of said switching equipment to said calling station line distinctive signal currents characteristic of the identity of the station lines to which connections are prepared, and relay means at said central office responsive to a signal from said calling station for actuating said switching equipment to complete a prepared connection to a wanted station line.

4. A telephone system, according to claim 3, further comprising timing means at said central office associated with a station line circuit for applying a distinctive tone signal to said calling station line from said interrupter and control device a predetermined time interval after the initiation of the operation of said timing means, means responsive to establishment of the connection to the wanted station line for initiating the operation of said timing means, means for forcing the release of the connection after the lapse of a further predetermined interval, a circuit for resetting said timing means, and means controlled by said first-mentioned relay means, responsive to the further operation of said magneto prior to the lapse of said further interval, for closing said circuit for resetting said timing means.

5. A telephone system, according to claim 3, further comprising a relay chain circuit at the central office for permitting waiting calls on station lines to be handled one at a time, and timing means for causing said relay chain circuit to advance to a next waiting call if a calling station line does not complete a prepared connection to a wanted station line within a predetermined time interval.

6. A telephone system, according to claim 3, further comprising a relay chain circuit at the central office for permitting waiting calls on station lines to be handled one at a time, and means for causing said relay chain to advance to a next waiting call responsive to the completion of a prepared connection.

7. A telephone system, according to claim 3, further comprising a first and second relay at the central office individual to each station line, a third relay, a circuit for energizing the appropriate first relay over contacts of said third relay responsive to a station line being placed in a calling condition, a chain circuit including contacts of said first relays and including contacts of said third relay for energizing the appropriate second relay, parallel energizing circuits for said third relay over contacts of said first relays, and contacts on said second relays over which said distinctive signal currents are applied to the calling substation line.

8. A telephone system comprising a plurality of station lines, a central office, a cross-bar switch at said central office having sets of horizontal and vertical terminals and horizontal and vertical magnets for actuating said sets of horizontal and vertical terminals respectively, connections from each said station line to a set of both horizontal and vertical terminals, means for transmitting a calling signal from a calling station to said central office, means responsive to said calling signal for operating a horizontal magnet particular to the calling station and for cyclically preparing circuits for said vertical magnets, means at said central office for successively transmitting signals to said calling station, each signal indicating thereat the condition of said cross-bar switch, means for transmitting a further signal from said calling station to said central office and means at said central office responsive to said further signal for closing a circuit for a vertical magnet for completing a connection to a wanted station line.

9. A telephone system comprising a plurality of station lines, a central office, switching equipment at said central office to which said lines are connected, a commutator device at said central office, signal means at a calling station for transmitting a calling signal to said central office, means at said central office responsive to said calling signal for causing said commutator device cyclically to prepare said switching equipment to make connection to said station lines in turn, an interrupter disk synchronously rotated with said commutator device and provided with cams characteristic of codes allotted to the respective station lines, interrupter contact springs adapted to be actuated by said disk, a source of tone current, means for applying said tone current to said calling station line over a circuit including said interrupter contact springs, means at said calling station for transmitting a connecting signal to said central office, and means at said central office responsive to said connecting signal for actuating said switching mechanism to complete a connection to a station line, as indicated by a characteristic code tone signal applied to the calling station line.

10. A telephone system comprising a plurality of station lines, a central office, a cross-bar switch at said central office having sets of horizontal and vertical terminals and horizontal and vertical magnets for actuating said sets of horizontal and vertical terminals respectively, connections from each said station line to a set of both horizontal and vertical terminals, a commutator device at said central office, signal means at a calling station for transmitting a calling signal to said central office, means responsive to said calling signal for causing said commutator device cyclically to prepare circuits for said vertical magnets in turn, an interrupter disk synchronously rotated with said commutator device and provided with cams characteristic of codes allotted to the respective station lines, interrupter contact springs adapted to be actuated by said disk, a source of tone current, a circuit including said interrupter contact springs connected to said station line, means for applying said tone current to said calling station line over said circuit, means at said calling station for transmitting a connecting signal to said central office, an energizing circuit for each of said vertical magnets, and means at said central office responsive to said connecting signal for completing the energizing circuit for the respective vertical magnet the circuit of which is prepared at the time said connecting signal is transmitted.

References Cited in the file of this patent

UNITED STATES PATENTS

| | | |
|---|---|---|
| 2,421,169 | Taylor et al. | May 27, 1947 |
| 2,540,644 | Baker | Feb. 6, 1951 |